April 18, 1961 R. B. WOLF 2,980,538
PROCESS AND APPARATUS FOR WASHING CURD FOR COTTAGE CHEESE
Filed June 30, 1959
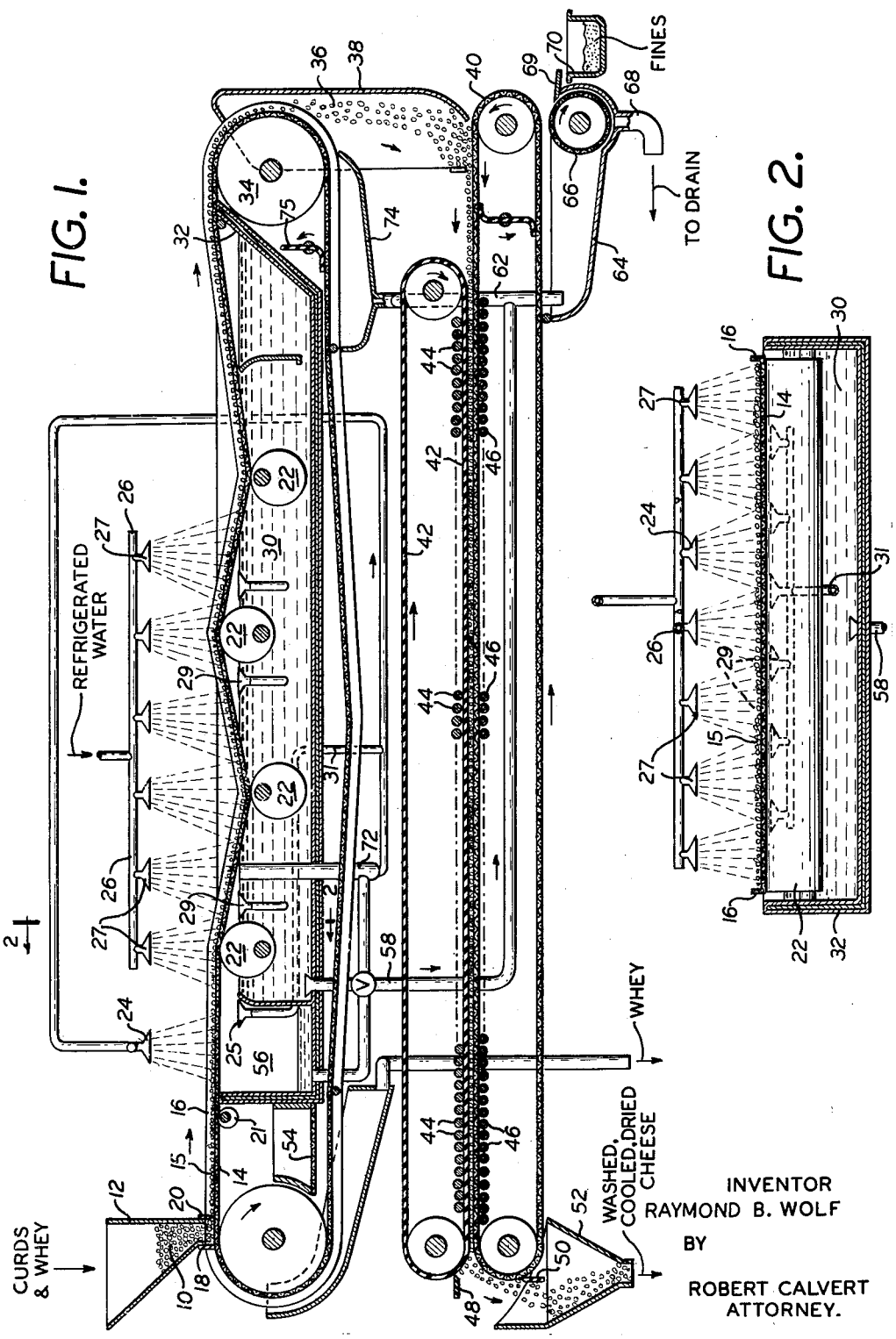
INVENTOR
RAYMOND B. WOLF
BY
ROBERT CALVERT
ATTORNEY.

United States Patent Office 2,980,538
Patented Apr. 18, 1961

2,980,538

PROCESS AND APPARATUS FOR WASHING CURD FOR COTTAGE CHEESE

Raymond B. Wolf, San Francisco, Calif., assignor to The Borden Company, New York, N.Y., a corporation of New Jersey Filed June 30, 1959, Ser. No. 824,058

10 Claims. (Cl. 99—116)

This invention relates to the handling and processing of curd in the making of cottage cheese.

The invention is useful in decreasing the hand labor currently required in the washing and draining of liquid from curd for cottage cheese and in avoiding unnecessary exposure of the curd to oxidation and to contact with airborne microorganisms during the time required for chilling.

The liquid to be removed from the curd is whey at the start and later whey diluted with water in continuously increasing proportion up to almost infinite dilution. Whey is used herein to include both these types of liquids.

The invention provides an effective, quick and economical process of removing whey from the curd, for chilling the curd to the necessary firm condition with a minimum time of exposure to molds, bacteria, other organisms and oxygen of the air, and dewatering the chilled curd, all in a continuous operation requiring no hand labor from the time the curd-whey mixture is delivered from the making vat until the processed curd is ready for compounding with cream and the other components into the finished cottage cheese.

This invention includes the herein described process and machine for handling the curd in making cottage cheese and, more particularly, means for rapidly and economically washing and cooling the curd, as by moving the curd and contained whey in layer form alternately down and up in a mass of cold water and also continuously forward, and subjecting the layer at intervals to sprays of refrigerated water applied in such manner as to drain through the layer of the curd between successive immersions thereof in the said cold water. In the commercial embodiment at present preferred, the invention includes also means for maintaining the layer of curd during the washing and cooling, in loose condition so that liquid passes freely over and between the individual lumps of the curd. In another embodiment, the invention comprises means for pressing the washed, firmed curd against a draining surface, to decrease the moisture content thereof, all in a convenient process.

The invention will be illustrated by description in connection with the attached drawing.

Fig. 1 is a side sectional view of a machine for effecting the washing, chilling, and pressing of the curd.

Fig. 2 is a sectional view on line 2—2 of Fig. 1.

All parts not shown are conventional.

There are shown the curd and whey mix 10 as delivered from the usual curd making vats to the hopper 12 with outlet at the bottom immediately above a woven wire belt 14 or any type of filtering support with shoulders 16 extending upward from each side thereof, as to a distance of approximately 2 inches, the shoulders preventing the mix 10 from falling over the sides of the support.

The cross bar or blade 18 restricts the backward flow of the wet curd so delivered to the belt. The adjustable blade 20 spreads the cheese curd on the belt as a layer of desired thickness. The eccentric roller 21 vibrates the belt and shakes out excessive whey or water before the curd passes to the next step. The belt with the curd thereon then passes over a series of eccentrically mounted rotated, i.e., power driven rollers 22. These subject the belt and the curd thereon to a combined vibrating and alternate rising and lowering, so as to alternately immerse the curd layer in the refrigerated water tank 32 for cooling and raise the curd for draining.

Disposed both above and below the belt and the curd layer thereon, during the use of the machine, are a series of water sprays. Part of the recovered water 30 is used in sprays 24 and 25, as a prerinse. The rest of this cold water 30 goes to the drain. Line 26 delivers refrigerated water from coolers (not shown) to sprays 27 and line 31 delivers refrigerated water to sprays 29.

The eccentrically mounted rollers 22 are at such a level that, at their upper parts, they alternately dip below and rise above the level of cold water 30. At the positions of sinking of the belt on the said rollers, it submerges the curd in the refrigerated wash water 30 which contains some whey and alternately raises the curd out of the water for direct contact with the refrigerated water from the sprays 27 and 29. After repeated up and down movement by the said rollers with accompanying submerging in the refrigerated water and subsequent draining and washing with the sprayed water, the curd is delivered over the change of direction drum 34, so that the curd falls, as shown at 36, in large part through chute 38 to a perforated or second woven wire belt 40 for passage between this belt serving as a draining conveyor and an overriding belt converging therewith, as the two belts at their adjacent reaches are moved towards the left end of the mechanism shown in the figures. The belts are forced together against the wet curd, sandwiched therebetween as by the series of coacting rollers 44 and 46. The resulting compression produces the required dewatering of the curd. The thus pressed and largely dewatered curd 48 is delivered finally by the conveyor 40 against the scraper knives 50 and 48 and into the collecting hopper 52 where the curd is ready for mixing with fresh cream or other usual components, to make the finished cottage cheese.

A screen 54, suitably mounted below the part of the belt 14 imemdiately to the right of the hopper 12, receives the whey or water and fine curd suspended therein. The liquor drains from the curd caught on this screen, the screen being of mesh size to allow the whey or water to pass therethrough but to retain the fine particles of curd. The accumulated curd on screen 14 and fine settlings on the bottom of tank 32 are removed at intervals by any usual means (not shown). A part of the fines which pass through the belt 14 at positions above tanks 32 and 56 do not settle, particularly since the rollers 22 cause some agitation. The unsettled fines go through outlet line 58 and finally into the line 62 which delivers the wet fines to collecting vessel 64. Here a rotary filter with filtering surface 66 filters water away to outlet 68 and collects the curd particles on the surface 66 for delivery against the scraper knife 69 to tank 70 for receiving fines. The fines recovered are placed in hopper 52.

The excess of refrigerated wash water that accumulates in tank 32 from the sprays 27 and 29 overflows thru overflow line 72. Part of this overflow enters line 58 and returns as a prerinse thru sprays 24 and 25. The balance of this water is discarded through line 62.

Flapper 75 dislodges adhering curd from the belt 14 when the major part of the curd has been removed. Conventional means (not shown) drive this flapper, so that it strikes the belt 14 from above, on the return or lower reach thereof. The curd then falls into the collector 74 and passes through line 62 from this collector to the final curd recovery tank 64.

The operation of the machine will be evident from the description of it that has been given.

The temperature of the water supplied to sprays 27 and 29 should be very low. The nearer the temperature is to the freezing point of water so long as the water is fluid, the more quickly the water chills and firms the curd and, as a result, the more it speeds up the washing and increases the shelf life of the finished cottage cheese. While we may use temepratures within the range about 1°–10° C. or somewhat higher we use for best results temperatures around 1°–5°, ordinarily about 2° C.

The pressure forcing the squeeze rollers 44 and 46 in the direction of each other and against the layer of curd therebetween supported on belt 40 is varied with the thickness of the layer of curd being dewatered by the resulting squeezing action. The thicker the layer of curd at this stage, the higher is the pressure forcing the rollers 44 in downwardly direction and rollers 46 upwardly. The pressure is adjusted in any case so that the finished dewatered curd going into hopper 52 contains the proper proportion of moisture for subsequent blending with cream. This is the proportion that causes the cream to film completely over each particle of the curd, in making the finished cottage cheese. The weight of the rollers 44 or even of the belt 42 alone is often adequate, to give the dewatering to the desired commercial percentage of moisture in the curd to be mixed with the cream.

The up and down and forward movement to which the layer of curd on the belt 14 is subjected in the alternating immersions and spraying with the refrigerated water give a quick and uniform cooling of the cheese curd over all of the surfaces. The vibrating action which the rollers 22 create continuously exposes fresh surfaces of the lumps of curd to the action of the refrigerated water.

While various rates of movement may be used, we move the belt 14 and curd thereon (1) up and down at a mean rate of about 20 to 30 revolutions per minute and (2) with a horizontal or forwardly component of velocity, that is, to the right for the upper reach of the belt in Fig. 1, of about 10 to 20 feet a minute. These rates are subject to considerable variation.

While the various sprays may be omitted, such as omission makes the process and machine less effective and less rapid, increases the amount of cold water required for washing the curd, and gives a product of inferior quality as compared to that obtained with the use of the sprays.

The movement of the layer of curd 15 downwardly in the water 30 and also the spraying by sprays 29 delivering water below the belt 14 loosen the curd 15, by decreasing the closeness of packing which would otherwise decrease the rate of flow of liquid through the curd.

The process effects a substantial saving of labor. It reduces the total time required for handling and processing the curd, from hopper 12 to collector 52, to less than about 5 minutes and normally only 2 minutes. It improves the quality of the cheese, by decreasing the time of contact of the warm curd with air or air-borne organisms. The results include improved flavor and keeping qualitites of the product.

There is no need with this machine, in exposing fresh surfaces of the curd to the cooling liquid, to stir the cheese with hand implements. There is thus saved not only time which, if extended, leads to undesirable oxidation or other reactions, but also considerable labor of operation. There is no need to pile curd for drainage, as the dewatering between belts 40 and 42 serves to effect the necessary dewatering in a very short period of time, at a pressure of about 0.5–3 pounds per square inch. This leaves a curd of water content about 75%–80%, as required by certain statutes.

The materials of construction are those that are usual in like parts in the handling of food products. Thus all the parts must be sanitary and free from rust. We use stainless steel or rubber where possible. Thus the vats, rolls, wire belts, tank walls, sprays, scrapers, blades, flappers, pumps and the like are suitably of stainless steel or of iron surfaced with stainless steel or other non-corrosive material. Other metals may be used to replace stainless steel in certain or all parts including iron, aluminum or chrome plated metal. The rollers 44 and 46 and the pressure belt 42 are suitably of Teflon, nylon or rubber, at least on their outer surfaces.

The openings in or meshes of the belt 14 are of size to cause water or whey to drain therethrough but to retain curd particles of all but the finest sizes which, if retained, would interfere objectionably with the draining of water. The openings in belt 40 retain the fines that remain in the curd after the preceding washing but permit drainage of water under the pressure applied by rollers 44 and 46.

A conventional drip pan (not shown) is disposed below belt 40 for return of expressed fluid to collector 64.

The machine and method are simple and effective in operation.

It is to be understood that it is intended to cover all changes and modifications of the examples of the invention herein chosen for the purpose of illustration which do not constitute departures from the spirit and scope of the invention.

I claim:

1. In washing whey from curd for cottage cheese and quickly chilling and firming the curd, the process which comprises moving the curd in layer form on a draining support alternately down and up, into and above a bath of refrigerated water, at a rate to cause the refrigerated water to move alternatively upwardly and downwardly in the said layer, subjecting the curd at positions above the said bath to sprayed refrigerated water, draining the sprayed water from the curd and repeating these steps until the whey is washed from the curd and the washed curd is chilled to firm condition.

2. The process of claim 1 which includes effecting the said down and up movement continuously and moving the curd also continuously with a horizontal component of velocity.

3. The process of claim 1 which includes subjecting the resulting washed and chilled curd to compression against a filtering member to remove water therefrom.

4. The process of claim 1, the said refrigerated water being at the temperature of about 1°–10° C.

5. A machine for the rapid washing and refrigeration of cottage cheese curd which comprises a tank for refrigerated water, means for forming a layer of the said curd on a filtering support, means for alternately immersing the layer in the water and raising the layer thereabove, means for maintaining the layer of curd in loose condition so as to promote passage of liquid therethrough, and means for draining liquid from the layer of curd.

6. The machine of claim 5 including, a filtering conveyor belt of size of openings to pass whey and water therethrough, means for applying a layer of the curd and whey mixture to the upper surface of the belt, and means for moving the belt down and up and in part horizontally in a bath of cold water.

7. The machine of claim 5, the said means for maintaining the layer of curd in loose condition including means for forcing water upwardly against the under surface of the said filtering support and through the layer of curd thereon.

8. The machine of claim 5, the said means for maintaining the layer of curd in loose condition including eccentrically mounted rollers extending transversely of the support and at a level near the surface of the water in the said tank so that the upper surface of each roller is alternately above the surface of the water and therebelow as the roller is rotated and means for rotating the rollers, the said support resting upon the rollers and being alternately raised and lowered through the said water as the rollers rotate and the downward movement of the layer of curd in the water causing the water to rise through the curd and to decrease the closeness of packing of the particles of the curd.

9. In washing whey from curd for cottage cheese and quickly chilling and firming the curd, the process which comprises moving the curd in layer form on a draining support alternately down and up, into and above a bath of refrigerated water, at a rate to cause the refrigerated water to move alternatively upwardly and downwardly in the said layer, draining the water from the curd, and repeating these steps until the whey is washed from the curd and the washed curd is chilled to firm condition.

10. In washing whey from curd for cottage cheese and quickly chilling and firming the curd, the process which comprises moving the curd in layer form on a draining support, subjecting the layer of curd at spaced positions to downwardly directed streams of cold water, forcing cold water upwardly between said positions so as to loosen the curd in the said layer and promote washing of whey therefrom, and compressing the washed curd to lower the water content thereof.

References Cited in the file of this patent

UNITED STATES PATENTS

| | | |
|---|---|---|
| 821,334 | Buskist | May 22, 1906 |
| 2,505,984 | Miollis | May 2, 1950 |
| 2,781,269 | Harper et al. | Feb. 12, 1957 |

OTHER REFERENCES

"Sweet Curd Cottage Cheese," University of Illinois College of Agriculture, Urbana, Ill., Circular 445, January 1936, page 8.